United States Patent [19]

Tanaka

[11] Patent Number: 4,843,408
[45] Date of Patent: Jun. 27, 1989

[54] THERMAL RECORDING DEVICE
[75] Inventor: Kazuyuki Tanaka, Tokyo, Japan
[73] Assignee: Seikosha Co., Ltd., Tokyo, Japan
[21] Appl. No.: 897,717
[22] Filed: Aug. 18, 1986
[30] Foreign Application Priority Data Aug. 16, 1985 [JP] Japan .................................. 60-180298

[51] Int. Cl.$^4$ ........................ G01P 15/10; H04N 1/21
[52] U.S. Cl. ............................... 346/76 PH; 358/296; 358/298
[58] Field of Search ................... 346/76 PH; 358/296, 358/298

[56] References Cited

U.S. PATENT DOCUMENTS

| 3,354,817 | 11/1967 | Sakarai et al. | 101/93 |
|---|---|---|---|
| 4,563,693 | 1/1986 | Masaki | 346/76 PH |
| 4,567,488 | 1/1986 | Moriguchi et al. | 346/76 PH |
| 4,568,951 | 2/1986 | Hasegawa et al. | 346/76 PH |
| 4,639,741 | 1/1987 | Inoue | 346/76 PH |

Primary Examiner—E. A. Goldberg
Assistant Examiner—Gerald E. Preston
Attorney, Agent, or Firm—Bruce L. Adams; Van C. Wilks

[57] ABSTRACT

A thermal recording device thermally records an image on a recording paper in the form of image segments gradated according to image information to collectively form the image. A thermal head has heating elements arranged in a row and activated to mark a row of dots on a recording paper. The thermal head is line-sequentially driven in the direction transverse to the row of dots to mark columns of dots to form a row-and-column arrangement of the dots such that the row-and-column arrangement is divided into a plurality of dot matrixes to define a plurality of corresponding image segments. A control circuit applies a control signal to the thermal head according to the image information to selectively activate the heating elements to thereby selectively mark dots in different densities during the line-sequential driving of the thermal head so that a specific pattern of selectively marked dots having different densities is formed within respective ones of the dot matrixes to gradate the image segments. The thermal head is divided into a plurality of thermal head blocks, each block including a predetermined number of heat elements and memory means for storing the control signal assigned to each block and effective to activate the heat elements of each block so that the plurality of blocks are time-sharingly activated during one line-sequential operation of the thermal head.

8 Claims, 6 Drawing Sheets

FIG. 1
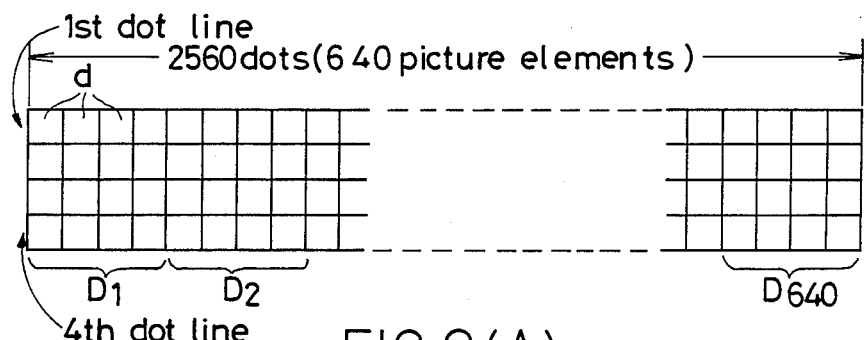
FIG. 2 (A)
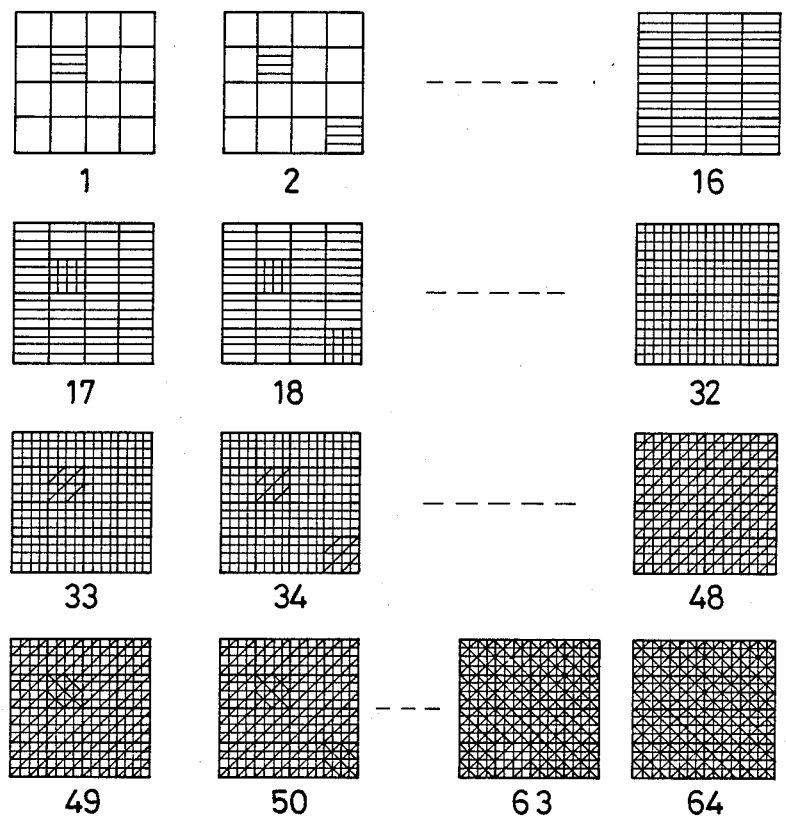
(B) (C)
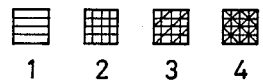

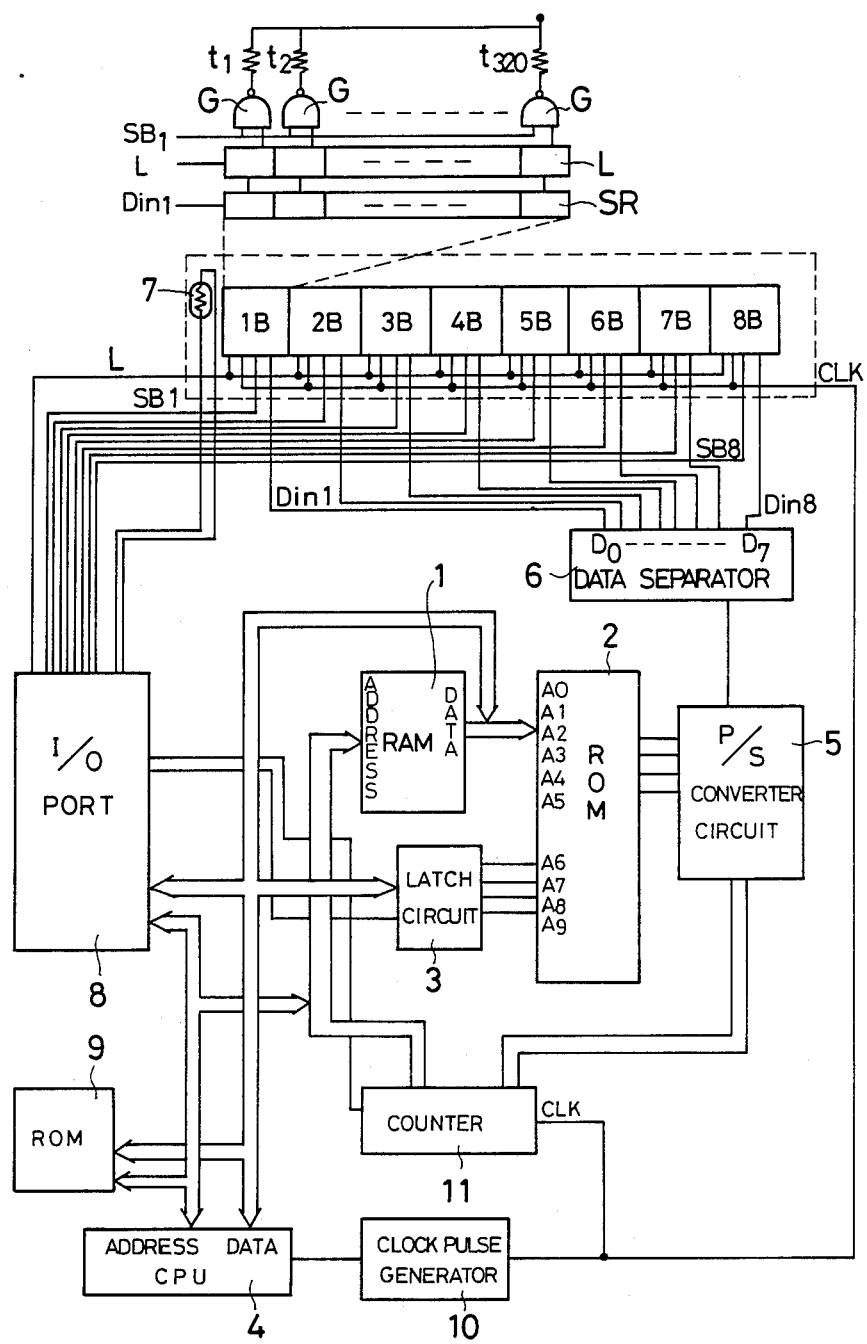

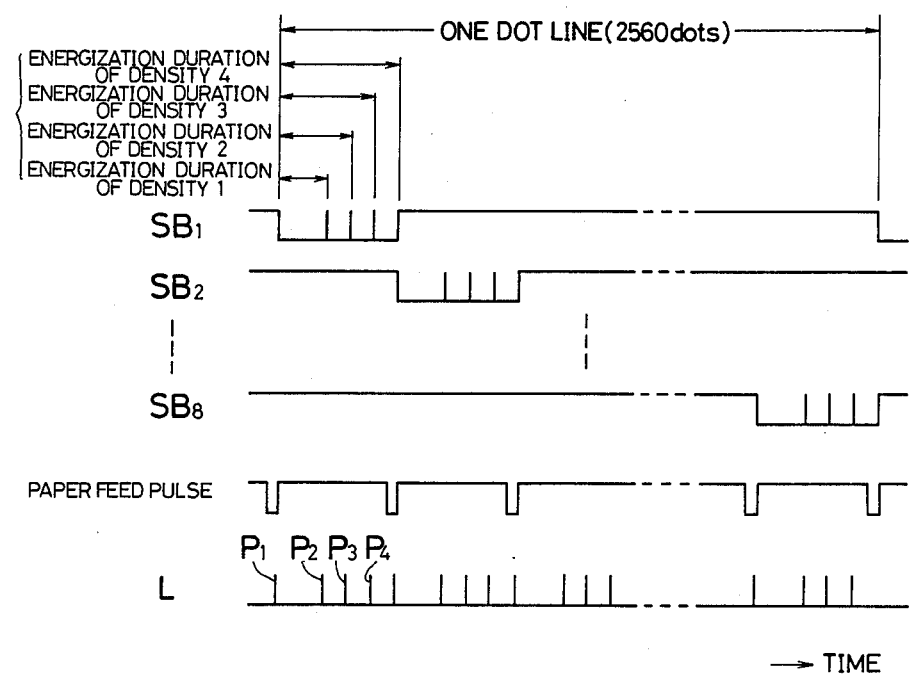

THERMAL RECORDING DEVICE

BACKGROUND OF THE INVENTION

This invention relates to a thermal recording device.

Hitherto, in thermal recording devices for performing recording by the use of heating elements arranged so as to cover entirely the width of a recording paper, a so-called density gradation process is generally employed to perform multi-grade recording in which the density of each dot itself is varied.

According to the foregoing process, each picture element is recorded by the use of one dot, so that although the number of heating elements per unit length can be set small, a variation of print density in an intermediate density range is large and hence the number of grades cannot be made larger than 16.

Further, the heating elements are divided into a plurality of blocks and driven in a mode of time-sharing. Since the recording of one line is commenced after the print data of the respective picture elements are always written in a shift register through its least significant bit position, the data must be transferred through non-recording blocks up to a block which has to effect recording. Consequently, the data transfer takes much time and a recording speed is decreased.

The objects of the present invention are to enhance a data transfer speed and to realize a variety of gradation.

SUMMARY OF THE INVENTION

The present invention resides in a thermal recording device of the type wherein each picture element is configured by dots arranged in N rows and M columns (N, M: integer not smaller than 2) and a variety of gradation is realized by means of a dot pattern and the density of each dot itself, which is characterized in that heating elements are divided into a plurality of blocks and data are directly distributed to the respective blocks.

BRIEF DESCRIPTION OF THE DRAWINGS

FIG. 1 is an explanatory diagram showing an embodiment of the configuration of picture elements according to the present invention, FIGS. 2A, 2B and 2C are an explanatory diagram showing an embodiment of dot patterns for determining a variety of gradation, FIG. 3 is a block diagram showing an embodiment of a circuit configuration, FIG. 5 is a time chart.

DETAILED DESCRIPTION OF THE INVENTION

Figure 4A:
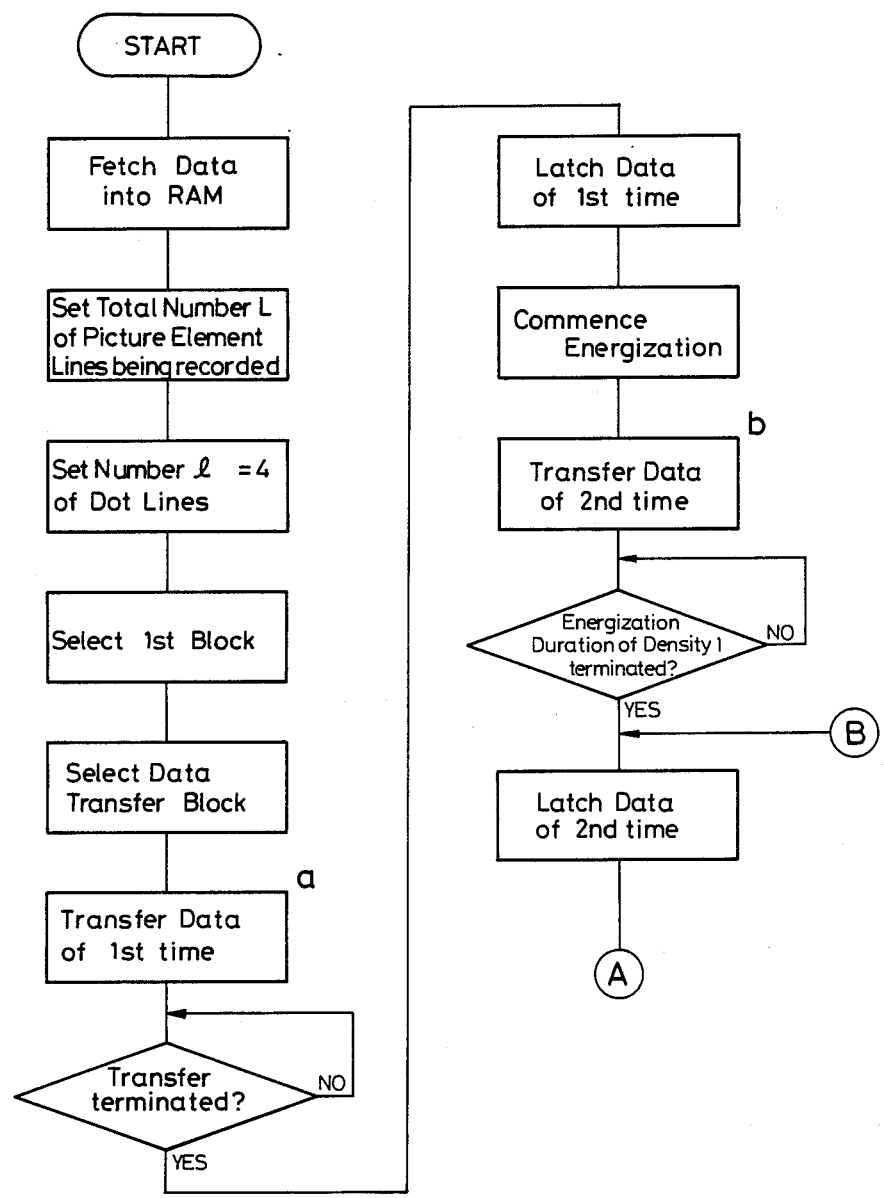
FIGS. 4A, 4B and 4C are a flowchart explanatory of the operation.

In the embodiment illustrated, 2560 heating elements are arranged in a row along a line to form a thermal line-printing head so as to cover entirely the width of a recording paper, these heating elements are divided into eight thermal head blocks, each consisting of 320 heating elements, and the heating elements of each block are driven in a of time-sharing made to mark one dot line or one row of dots composed of 2560 dots on the recording paper during one operation of the thermal line-printing head.

FIG. 1 shows four dot lines obtained by line-sequentially and successively driving the thermal-printing head four times in the direction transverse to the row of dots $D_1$ through $D_{640}$ designate picture elements or image segments in the form of dot matrixes, each picture element is formed of sixteen dots d, ..., d arranged in four rows and four columns, and the gradation of each picture element can be varied stepwise within the range of 64 grades, as shown in FIG. 2A, by means of its dot pattern (the number of marked dots included in one picture element) and the density of marked dots (four grades: Density 1 through Density 4). Specifically, a variety of the gradation is achieved by forming the respective dots in the order shown in FIG. 2B and by assigning to each dot one of four-graded densities ranging from Density 1 to Density 4.

A practical recording or printing process will now be described. In FIG. 3, 1 designates a RAM for storing the image gradation information of picture elements to be recorded, 2 designates a ROM which stores gradation data relating to the dot patterns of the picture elements and the densities of the dots effective to determine the picture element gradation, and 3 designates a latch circuit for properly reading out the gradation data from the ROM 2 on the basis of data bed from a CPU 4. 5 designates a parallel-serial converter circuit for converting the parallel data read out from the ROM 2 into a control signal of a bit-serial form. 6 designates a data separator for directly distributing data fed from the parallel-serial converter circuit 5 to eight thermal head blocks 1B through 8B Each thermal head block is composed of a shift register SR of 320 bits, a latch circuit L of 320 bits, gate circuits G, ..., G, and 320 heating elements $t_1$ through $t_{320}$. 7 designates a thermistor provided in the vicinity of the heating elements for controlling a time duration of energization depending upon a temperature. 8 designates an I/O port, and 9 designates a ROM storing a table of temperature-dependent energization duration. 10 designates a clock pulse generator, and 11 designates a counter for specifying an address of the RAM 1.

The operation of the foregoing structure will now be described with reference to FIGS. 4A, 4B, 4C and 5. At first, under the control of the CPU 4, the image gradation information of a first picture element line composed of four successive dot lines and containing 640 picture elements is fetched into the RAM 1. Then, the total number L of picture element lines to be recorded is set and the number l=4 of dot lines of one picture element line is also set. Subsequently, by means of pulses $SB_1$ shown in FIG. 5, the first thermal head block 1B is selected. Namely, the gate circuits G, ..., G of the thermal head block 1B shown in FIG. 3 are opened. In addition, by means of the data separator 6 shown in FIG. 3, the block 1B is selected to receive from the parallel-serial converter circuit 5.

Then, by means of the output of the counter 11, the gradation information of the first picture element is read out from the RAM 1, and gradation data representative of a dot pattern stored in the ROM 2 is specified or addressed according to the image gradation information. 1st row dot line, of the thus specified dot pattern which is composed of a 4×4 matrix is selected by means of address inputs A8 and A9 fed from the latch circuit 3, and by means of address inputs A6 and A7, the repetition number of operation to be effected in the thus selected first row dot line is specified. That is, the first row dot line is selected repeatedly four times by the address inputs A6 and A7, so that the first row dot line is subjected to an energization duration of four grades and hence each dot of the first row dot line has a four-graded density.

By means of the outputs of the RAM 1 and the latch circuit 3, the first dot data (four-bit) of the first dot line is read out from the ROM 2, then, the second dot data of the first dot line is read out, and subsequently and successively, the third dot data through 320th dot data of the first dot line are read out. The thus read-out dot data are converted by the converter circuit 5 into a serial form, and are written in the shift register SR of the thermal head block 1B via the data separator 6. This operation corresponds to Data Transfer of 1st time (a) shown in the flowchart of FIG. 4A. Upon completion of this transfer, the data are latched in the latch circuit L of the first head block B1 by means of pulse $P_1$ shown in FIG. 5, and the 1st time energization of the heating elements $t_1$–$t_{320}$ is selectively carried out according to the data latched in the latch circuit L to mark dots having the Density 1. During this energization, the data of 2nd time of the first dot line are read out from the ROM 2 and written in the shift register SR of the first head block B1 (FIG. 4A, b) in a similar manner to Data Transfer of 1st time.

Figure 4B:
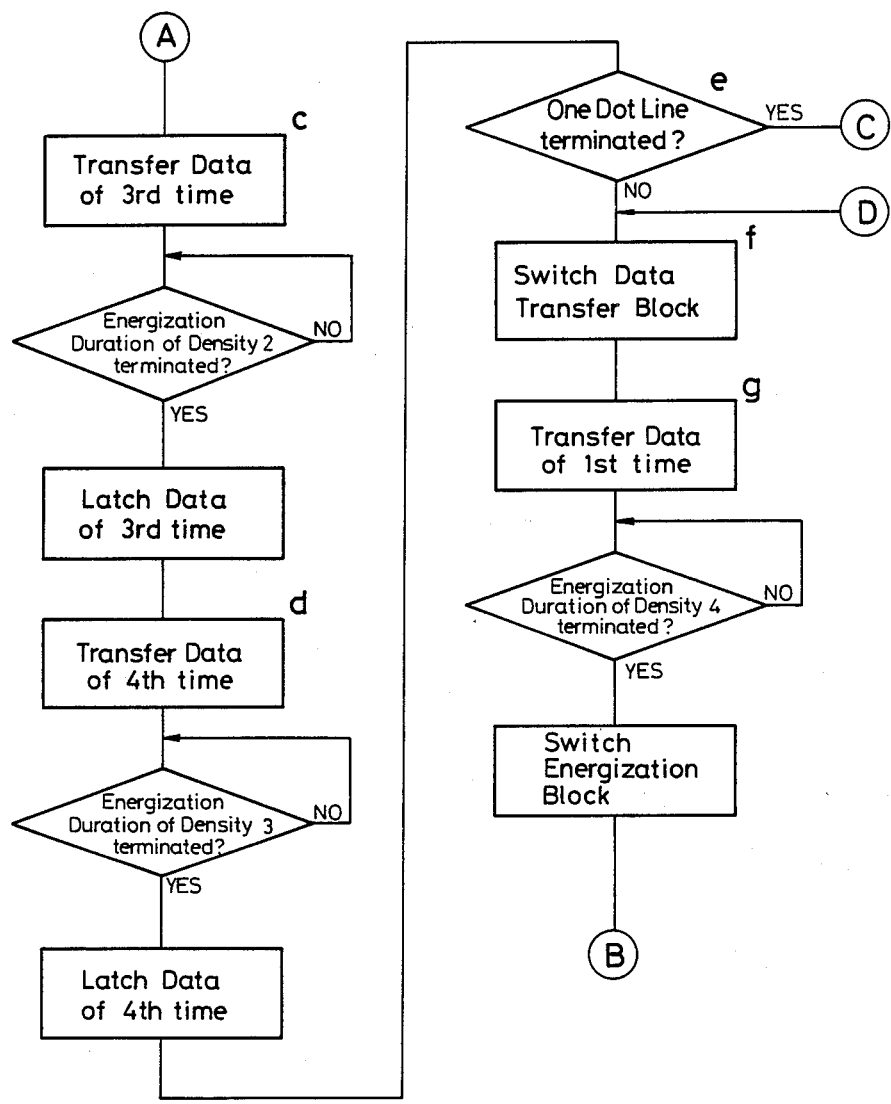

As the energization duration of Density 1 based on the data of 1st time terminates, the data of 2nd time are latched in the latch circuit L by means of pulse $P_2$ shown in FIG. 5. At this moment, marking of the dots of Density 1 in the first dot line terminates, and hereafter, only the dots of Density 2 and higher densities are successively marked on the recording paper. During the 2nd time energization, the data of 3rd time are transferred to the shift register SR (FIG. 4B, c). As the energization of Density 2 terminates during the assigned duration, the data of 3rd time are latched in the latch circuit L by means of pulse $P_3$ shown in FIG. 5. At this moment, marking of the dots of Density 2 in the first dot line terminates, and subsequently, the dots of Density 3 are marked on the recording paper.

During the foregoing energization, the data of 4th time are transferred to the shift register SR (FIG. 4B, d). As the energization duration of Density 3 terminates, the data of 4th time are latched in the latch circuit L by means of pulse $P_4$ shown in FIG. 5.

At this point, the judgment (FIG. 4B, e) is performed as to if all of the eight head blocks have been processed to complete the marking of the four-graded first dot line, and since the answer is NO at this moment, by means of the data separator 6, the second head block B2 to which data are transferred is selected (FIG. 4B, f). Thus, the data of 1st time of the first dot line assigned to the second head block B2 are transferred to a register within the second thermal head block 2B (FIG. 4B, g). Then, after the energization of 4th time of the first head block B1 terminates, the gate circuits within the second thermal head block 2B are opened by means of the pulses $SB_2$ shown in FIG. 5, and the block to be energized is switched to the second block.

Hereafter, in a similar manner to the operation of the first head block B1, the recording of one part of the first dot line assigned to the second head block B2 is performed.

Figure 4C:
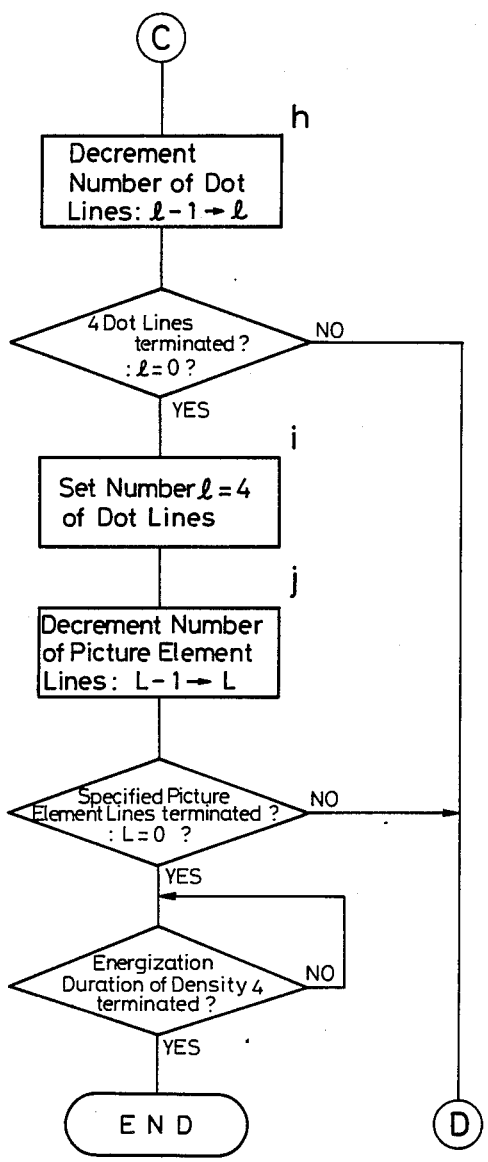

In this way, the first block through the eighth block are operated successively to complete the recording of the first dot line, and thereafter, the second dot line is specified (FIG. 4C, h). The second dot line is then recorded similarly to the recording of the first dot line, and subsequently, the third and fourth dot lines are recorded, whereby recording of the first picture element line is completed.

As the foregoing recording operation terminates, the number of dot lines is again set to 4 (FIG. 4C, i), and the second picture element line is selected (FIG. 4C, j) and recorded similarly to the recording of the first picture element line. Then, as recording proceeds up to the specified number L of picture element lines, all of recording terminates.

In the meantime, since the thermistor 7 is always monitoring the temperature of the thermal heads, an optimum pulse duration is selected from the table of energization duration stored in the ROM 9 on the basis of the monitored temperature information, and the recording operation is performed with the optimum energization duration according to this temperature.

Although, in the foregoing embodiment, each picture element is formed of the dots arranged in four rows and four columns, it is to be understood that a dot pattern generally consists of N rows and M columns (N, M: integer not smaller than 2).

Further, the number of density grades of the dot should not be limited to that mentioned hereinabove.

In the type of recording device wherein each picture element or image segment is configured by a matrix consisting of a dot plurality of dots and a variety of the image segment gradation is given by means of a dot pattern and the density of each dot, the present invention has improved the device by dividing the row of heating elements into a plurality of blocks and directly gradation data to the memory circuits provided in the respective blocks, whereby a variety of the gradation is realized, the information transfer speed is enhanced, and the record of high resolution can be achieved at a high speed.

What is claimed is:

1. A thermal recording device of the type wherein each picture element is recorded on a recording paper in the form of a plurality of dots arranged in N rows and M columns (N, M: integer not smaller than 2) and a gradation of the picture element is determined by means of a dot pattern and the density of each dot according to gradation information,
the improvement comprising:
a plurality of heating elements arranged along a line so as to cover entirely the width of a recording paper and divided into a plurality of blocks for recording gradated picture elements;
a circuit for generating data relating to the dot pattern of each picture element and the density of each dot to be recorded on the basis of the gradation information of each picture element;
memory circuits provided in the respective blocks for storing the data fed from the first-mentioned circuit and assigned to the respective blocks to operate the same; and
a data separator provided for directly distributing the assigned data to the respective memory circuits from the first-mentioned circuit.

2. A thermal recording device for thermally recording an image on a recording medium in the form of a plurality of image segments gradated according to image information to collectively form the image, the device comprising: a thermal head including a plurality of heating elements arranged in a row and activated to generate heat to mark a row of dots on a recording medium; driving means for line-sequentially driving the thermal head in the direction transverse to the row of dots to mark columns of dots on the recording medium to form a row-and-column arrangement of the dots such that the row-and-column arrangement is divided into a plurality of dot matrixes to define a plurality of corresponding image segments; and controlling means for applying a control signal to the thermal head according to the image information effective to selectively activate the heating elements to generate different amounts of heat to thereby selectively mark dots in different densities during the line-sequential driving of the thermal head so that a specific pattern of selectively marked dots having different densities is formed within respective ones of the dot matrixes to gradate respective ones of the image segments according to the image information.

3. A thermal recording device according to claim 2; wherein the thermal head has a sufficient number of heating elements to cover substantially the width of a recording medium.

4. A thermal recording device according to claim 3; wherein the driving means includes means for line-sequentially driving the thermal head N times to form a predetermined number of dot matrixes arranged in a row, each dot matrix being comprised of N rows of dots and M columns of dots, where M is determined by dividing the number of heating elements by the predetermined number of dot matrixes.

5. A thermal recording device according to claim 2; wherein the thermal head comprises a plurality of divided thermal head blocks, each block including a predetermined number of heating elements arranged in a row, and memory means for storing the control signal assigned to each block and effective to activate the heating elements of each block so that the plurality of blocks are time-sharingly activated during one line-sequential operation of the thermal head.

6. A thermal recording device according to claim 5; wherein the controlling means includes distributing means for successively distributing the control signal to assign the same to each thermal head block.

7. A thermal recording device according to claim 6; wherein the controlling means includes ROM means addressed by the image information to provide gradation data representative of a specific pattern of dots having different densities within a dot matrix.

8. A thermal recording device according to claim 7; wherein the controlling means includes converting means for converting parallel gradation data into a serial control signal.

* * * * *